Feb. 10, 1948.    G. W. FILES    2,435,823
ROENTGENOLOGICAL METHOD AND APPARATUS
Filed June 28, 1946
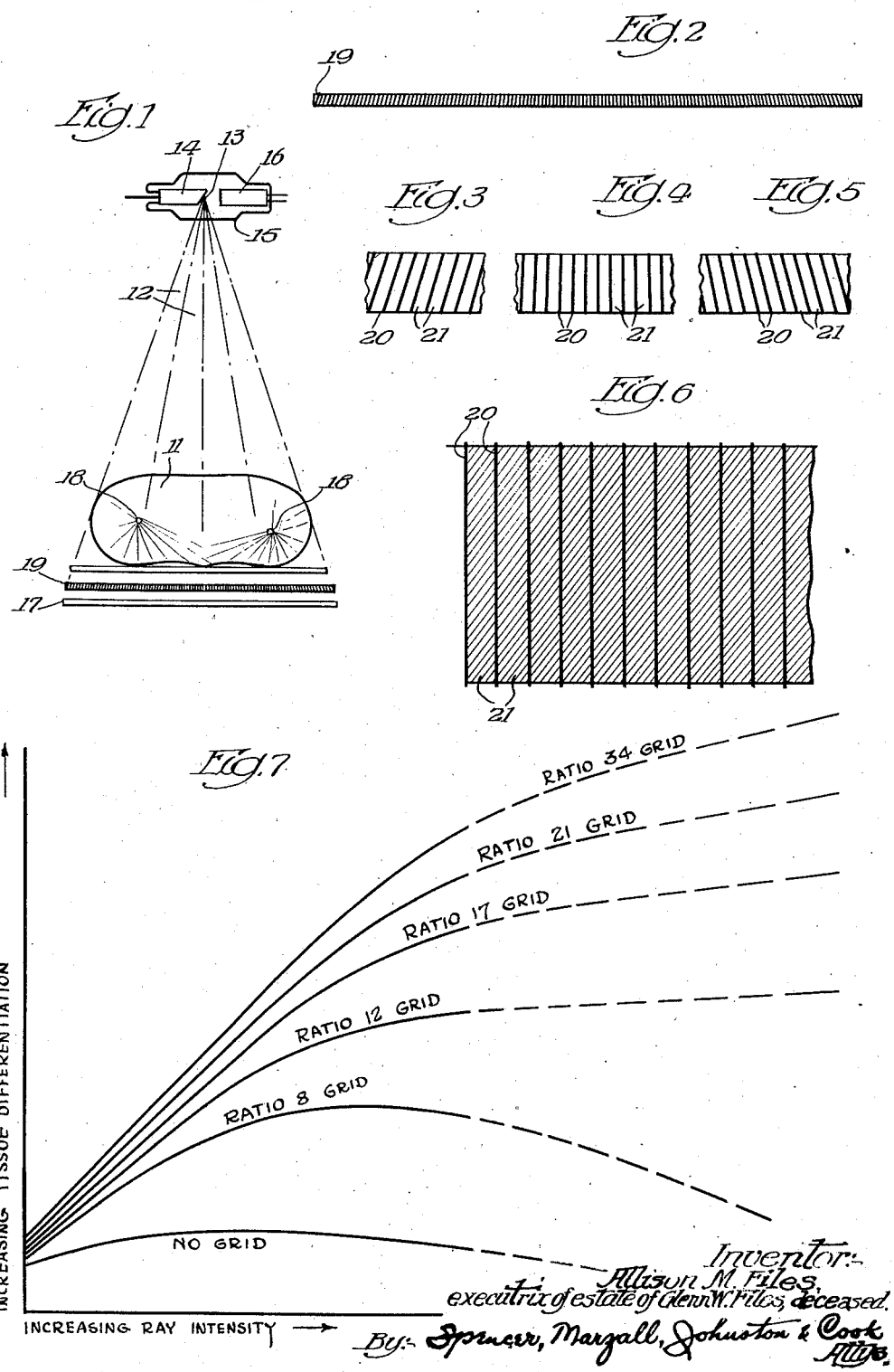
Inventor:-
Allison M. Files,
executrix of estate of Glenn W. Files, deceased.
By:- Spencer, Marzall, Johnston & Cook
Attys.

Patented Feb. 10, 1948

2,435,823

UNITED STATES PATENT OFFICE 2,435,823

ROENTGENOLOGICAL METHOD AND APPARATUS

Glenn W. Files, deceased, late of Elmwood Park, Ill., by Allison M. Files, executrix, Chicago, Ill., assignor to General Electric X-Ray Corporation, Chicago, Ill., a corporation of New York Application June 28, 1946, Serial No. 679,940

5 Claims. (Cl. 250—63)

The present invention relates in general to roentgenology, and has more particular reference to apparatus for, and methods of, making improved shadow pictures, on ray sensitive material.

Ray pictures, of course, are made by exposing an object to be pictured to the action of radioactive emanations, from a suitable source, and by applying the resulting ray shadows of the object to a layer of ray sensitive material, either in the form of sensitive film or sensitive fluorescent screen means. Perhaps the most important defect apparent in shadow pictures is the indefinite, blurred character of ray pictures made in accordance with existing picture making techniques, the value of ray pictures, in the final analysis, being the clarity and exactness with which they present the true internal structure of tissues or material being pictured.

Many variable factors, of course, are necessarily dealt with in the making of shadow pictures, including the intensity of the activating ray beam, which, where the activating beam comprises X-rays produced by a suitable generator, depends upon the electrical characteristics and control of the generator; the nature of the tissues being pictured, including tissue structure, as well as sectional thickness; the characteristics of the ray sensitive picture receiving layer; the control of secondary radiation, that is to say, radiation other than that from the ray source, such as may be generated in the material or tissues being pictured as a result of exposure to the primary activating ray; and other variables, including time of exposure of the tissues being pictured to the activating ray, as well as the judgment of the picture making technician.

Ever since the establishment of roentgenology, as an art, scientists and others have been striving to improve the character of shadow pictures by improving the definition, or clarity, of the ray picture. In this connection, every variable aspect which enters into the making of ray pictures has been carefully and critically examined in an effort to improve picture definition, or quality.

Accordingly, an important object of the present invention is to provide for the production of shadow pictures having fine definition or detail sharpness characteristics, to thereby produce pictures having superior value for diagnostic and other purposes.

Much effort has been expended upon the production of sensitive material for receiving shadow pictures, in an effort to produce material highly sensitive to slight variations in the intensity of rays impinging thereon. In this connection, sensitive material, of necessity, must show appreciable contrast characteristics in order to distinguish between rays passing through tissues of unlike opacity. At the same time, material having good contrast characteristics for the sake of shadow perception in the resulting picture will tend to impair definition, that is to say, the ability to distinguish between the shadows of rays passing through tissues having slightly different ray transmitting characteristics.

Accordingly, another important object of the invention is to provide for the production of ray pictures of superior quality, as to definition, without sacrifice of contrast factors to any deleterious extent.

Another important object is to improve definition in ray pictures by providing for the substantial, if not complete, elimination of the effects of secondary radiation; a further object being to eradicate the deleterious effects of secondary radiation in the making of ray pictures.

Another important object is to provide improved means for eleminating the effects of secondary radiation, in ray picture making; a further object being to provide improved diaphragm structures for the elimination of secondary ray effects.

Another important object is to provide improved operational techniques to utilize the improved diaphragms of the present invention to maximum advantage in the suppression of secondary rays, in the making of ray pictures.

The foregoing and numerous other objects, advantages and inherent functions of the invention will become apparent as the same is more fully understood from the following description, which, taken in connection with the accompanying drawings, discloses the several aspects of the invention.

Referring to the drawings:

Fig. 1 is a diagrammatic showing of ray picture making apparatus;

Fig. 2 is a sectional view through a diaphragm for the suppression of secondary ray effects, in accordance with the present invention;

Figs. 3, 4, and 5 are enlarged views of portions of the diaphragm shown in Fig. 2;

Fig. 6 is a fragmentary view of a portion of the diaphragm on a greatly enlarged scale; and Fig. 7 shows comparative diaphragm performance graphs.

It should be understood that roentgenologic pictures are made, as indicated in Fig. 1, by exposing an object 11, to be pictured, to radioactive rays 12 emanating from a suitable ray source 13, such as the anode 14 of an X-ray generator 15, energized for the production of X-rays, at said anode, by electrons emitted by the cathode 16 of the generator, and impelled to impinge upon the anode under the influence of electrical potential applied between the anode and cathode. A shadow picture of the object 11, so activated by the rays 12, may be formed upon a layer of ray sensitive material 17, disposed adjacent the object, in position to receive a shadow picture thereof upon the layer 17. In this connection, the layer may comprise any suitable ray sensitive film for the making of a permanent picture, or it may comprise a suitable ray sensitive fluorescent screen.

Definition in the resulting ray picture is affected, to some extent, by the intensity of the activating rays, in accordance with the nature of the material being pictured. Rays of low intensity, in passing readily through relatively ray pervious tissues, may readily picture the structure of such tissues, but may not afford comparable definition in picturing the structure of less pervious material. On the other hand, ray emanations of relatively high intensity capable of penetrating and picturing fairly impermeable, or solid, material, may tend to wash out or destroy the picture definition of highly permeable tissues. Consequently, ray intensity, in making shadow pictures in accordance with current practice, has to be carefully and accurately determined, in accordance with the nature of the tissue to be pictured; and it is often impossible to picture relatively permeable, and impermeable or opaque, material simultaneously with any degree of satisfactory definition in the various pictured parts of substantially unlike opacity.

Where X-rays, produced by a suitable generator, are employed in shadow picture making, the ray intensity may be determined, in part, by the rate of electron emission from the electron emitting cathode of the generator. The emitting element is usually a filament, electron emission from which is controlled by regulating the electrical current delivered to the filament for the purpose of exciting the same for electron emission. Ray intensity, however, is, also, a function of the rate and velocity of impact of electrons upon the anode target of the generator, the same, in turn, being a function of uni-directional electrical power applied between the anode and cathode of the generator for impelling electrons, emitted at the cathode, to impinge upon the anode. As a consequence, the value of filament exciting current, as well as anode-cathode potential and current, in the generator, are important factors ultimately affecting the character of ray pictures produced with the generator functioning as a ray source. Ordinarily, however, it is more convenient to adjust anode-cathode power than filament current, so an X-ray generator is usually arranged to operate at constant filament current, ray intensity being adjusted by altering either anode potential or current, or both.

Duration of exposure is, also, a factor controlling definition in the resulting radiographic picture, being related in this respect to ray intensity. By increasing or decreasing the exposure interval in picture production at a constant ray intensity optimum, exposure intervals may be determined, empirically, for each tissue type, and thickness, and for every kind of sensitive material used in the making of shadow pictures. It is generally true that increasing exposure time will improve definition in pictures of relatively dense tissue structures, but will tend to wash out and obliterate, or fog, picture portions of tissue relatively transparent to the activating rays. In this connection, also, it is usual to measure ray intensity, in radiography, as energy applied during the exposure or picture making interval. This data conveniently may be expressed as a function of the multiple of anode voltage, anode current and exposure time interval. Since unidirectional power is usually supplied through suitable rectifiers from an alternating current power source, and since it is more convenient to measure the power drawn from the source than to measure it at the point of delivery in the generator, anode voltage and current are commonly designated in terms of alternating current peak kilovolts of potential (k. v. p.) and milliamperes of current, drawn from the power source. Furthermore, since it is more convenient to adjust current and time of exposure than to vary voltage, it is usual to alter ray intensity by varying milliampere-seconds (m. a. s.), either by changing the anode current supplied to the generator during an exposure interval, or by changing the duration of the exposure interval.

Since radioactive emanations, or rays, pass selectively through matter of different kinds, and since the intensity of a ray decreases proportionally as it passes through matter, each different kind of matter decreasing ray intensity in accordance with its individual ray transmitting characteristics, the character of a ray picture of any object will be affected by the nature of the tissue, or tissues, composing the object, including the tissue thicknesses through which the rays pass. As a consequence, the definition and clarity of a shadow picture of a relatively thick body made with relatively low intensity rays may be considerably less than definition accomplished in picturing a relatively thinner body of the same type of matter; and the difference can not necessarily be reduced merely by increasing the intensity of rays utilized in picturing the relatively thicker body. Increasing ray intensity, as heretofore mentioned, may result merely in washing out the definition in the picture portions corresponding with relatively more ray permeable portions of the object being pictured.

During the development of the radiographic art, technicians, by trial and error methods, have discovered optimum methods and techniques for the control of X-ray intensity, physical dimension between ray source, sensitive material, and object being pictured, and the contrast characteristics of the sensitive material with respect to the size and texture of the component parts of the object being pictured; the same being matters that can be determined mathematically, or by empirical methods.

Possibly the most important single contribution to the art of making ray pictures, so far as picture definition is concerned, was the recognition by Gustav Bucky of the fact that the object being pictured, when exposed to picture making ray emanations, itself may become energized as a ray source, substantially throughout, thereby constituting the various portions of the object being pictured as secondary sources of ray emanations, as indicated at 18 in Fig. 1, such ray emanations, impinging on the sensitive picture receiving material, from substantially every direction, being responsible for fogging, blurring, and consequent lack of detail definition in the resulting picture.

Bucky announced his discovery and his method of controlling so-called "secondary" radiation, in the year 1913, and provided a multiple cell diaphragm, or grid, located between the object being pictured and the layer of sensitive picture receiving material, in an effort to suppress the effects of secondary radiation.

Crude as the original Bucky device was, it demonstrated that secondary or scattered radiation from the object being pictured constitutes the greatest single detriment to detail visibility, or definition, in ray pictures.

In spite of the Bucky discovery, the characteristics of sensitive picture receiving material have received far more attention, both from the standpoint of improving the sensitive material and technique of using the same, as well as the improvement of auxiliary apparatus, including ray generators.

So far as definition in the resulting picture is concerned, it is desirable that the activating rays emanate from as small a spot as possible in the generator. Even in the early days of roentgenography, X-ray generators having exceedingly fine focal spots were available. X-ray tubes presently available have no finer focal spots than early generators. It is true that the recently developed rotating anode generators provide a means for using exceedingly fine focal spots at sufficiently high energy, or X-ray, intensity to obviate loss of detail due to unpreventable motion of the part being pictured. The rotating anode tube, however, except for adding certain facilities in operative procedure, has done nothing to improve detail visibility, other than obviating blurring in the resulting picture due to motion of the part being pictured.

One of the defects of the original Bucky diaphragm lies in the fact that its grid pattern is pictured as a shadow on the sensitive material, be it film or fluoroscopic screen, such pattern detracting, to a considerable extent, from the clarity of the picture, and thereby minimizing the improvement in definition brought about through the reduction of secondary fog by use of the diaphragm.

The Bucky diaphragm, however, was improved by Hollis Potter, in the year 1916, who proposed the elimination of the diaphragm grid shadow from the resulting picture by maintaining the diaphragm in carefully calculated constant motion, whereby to blur to extinction the shadow picture of the grid without, however, affecting the shadowgraph of the object being pictured.

Under the impetus of the Potter discoveries, the Bucky diaphragm has evolved into a structure comprising alternate strips of ray impervious material, such as lead, and ray pervious spacing strips of material such as wood, the United States patent to Wantz and Kizaur, No. 2,115,755, showing a recently developed form of the Potter-Bucky diaphragm.

A grid 19 for controlling secondary radiation, such as may emanate from points 18 in the body 11, is shown in Fig. 1 of the drawings submitted herewith.

It should be understood that the ray impervious strips in a Potter-Bucky diaphragm are substantially equally spaced apart by means of intervening strips of ray pervious material. These impervious strips commonly are of the order of 1/50 inch in thickness, having a width of the order of 5/8 inch, with a spacement between adjacent ray impervious strips of the order of 1/6 inch. The grid ratio, that is to say, the ratio of strip depth to strip spacement, is of the order of 4. The filter factor, that is to say, the ratio of the spacement between impervious strips to the thickness of the impervious strips, is of the order of 8.

An inherent disadvantage of the Potter-Bucky type diaphragm is that, in excluding secondary radiation from the sensitive film or picture receiving screen, it also excludes a portion of desirable picture making ray emanations, and to that extent impairs the possible optimum quality of the resulting picture. The filter factor is a measure of this disadvantage which requires increased energy, or ray intensity, with corresponding difficulties, in the making of shadow pictures through Potter-Bucky type diaphragms. Increasing the filter factor, to minimize this disadvantage, as by decreasing strip width, is, of course, limited by mechanical considerations. Increasing the factor, by increasing strip spacement, reduces the grid ratio and impairs the beneficial effects of the diaphragm. A factor of 8, however, is practicable and does not very materially increase the ray energy required for the making of pictures.

There has been very little alteration in the structure, arrangement and use of the Bucky type diaphragm since the Potter suggested modifications. During the last thirty years Potter-Bucky type diaphragms, of grid ratios ranging between 4 and 8, have been made and used, and grids having a ratio of 6 have been accepted as the ultimate practical diaphragm so far as definition in the resulting picture is concerned. Perhaps the most informative research, in this connection, since the work of Potter, was the work of R. B. Wilsey, who reported the results of his investigations during the year 1921. In the course of a general study of the scattering of X-rays under the conditions of deep tissue roentgenography, as through water layers varying in depth up to 10 inches, Wilsey found that scattered radiation affecting the film was from 2½ to 11 times as intense as the primary ray beam. The relative intensity of scattered to primary radiation was little affected by the intensity of the primary ray beam measured in terms of the voltage of the tube comprising the X-ray source. Wilsey also found that scattered or secondary radiation is little affected by the use of filters between the material being pictured and the sensitive picture receiving material, nor by the use of intensifying screens in conjunction with the film receiving material. Wilsey reported, further, his opinion that the only effective means for reducing the effects of scattered radiation lie in the use of the Bucky diaphragm principle.

The present invention was made after careful and exhaustive examination of all available published, and much unpublished, material bearing on the subject of definition in ray pictures. The inventor undertook a broad review of the entire subject in an effort to produce a worth while improvement in the diagnostic use of ray pictures. To this end, a complete re-examination of all phases entering into the production of ray pictures was undertaken, including the testing of screens, films, ray generators, and other variable factors involved, including the possibility of improving the structure and method of using diaphragms for the purpose of increasing detail sharpness in ray pictures.

A phenomenon noted in connection with the employment of the Bucky diaphragm in conventional fashion is the effect commonly referred to as "under cutting." Under cutting results in the apparent washing out of the marginal portions in the shadow picture of a relatively ray opaque object being pictured, and is, no doubt, present in pictures made without employing a diaphragm. In such pictures, however, under cutting is not readily apparent, for the reason that secondary rays scattered in every direction will completely under cut the image of a relatively opaque object, so that its image in the final picture, being substantially entirely under cut, does not show any appreciable under cutting at all. With the advent of the Potter-Bucky diaphragm improvement, under cutting became more apparent in the edge portions of shadow pictures of relatively opaque objects, but the effect was accepted as caused by diffraction of rays at the edges of the relatively opaque object being pictured, the notion that such under cutting might be caused by such secondary radiation as might pass through the diaphragm being discounted, for the reason that the phenomenon occurs even where a piece of X-ray impervious material, like lead, is pictured with no surrounding matter to afford a source of secondary radiation. In any event, during the past thirty years, in no instance has any reference been made to the removal of secondary radiation for the purpose of eliminating under cutting.

It had, also, been noted that increasing ray intensity, when using Potter-Bucky diaphragms, did not affect under cutting, and that employment of ray intensities above critical values resulted in an actual diminution of tissue differentiation in the resulting picture.

Potter had shown that a grid having a ratio of 2½ absorbs 76% of secondary radiation, that a ratio 4 grid absorbs 83%, that a ratio 5 grid absorbs 86%, while a ratio 6 grid absorbs 89% of secondary radiation, and that a ratio 8 grid would absorb substantially all scattered radiation.

Wilsey, as a result of his exhaustive studies, had recommended, for optimum results, grids having a ratio of 5.

It was an accepted principle that grids having ratios of the order of 6 to 8 afford the ultimate in beneficial grid construction so far as the suppression of the definition destroying effects of secondary radiation are concerned. There is no indication whatsoever in available literature that anyone, prior to the present invention, gave any thought to improving the general diagnostic ray picture technique through a change in Bucky diaphragm construction. In fact, considerable information is available, in addition to that given herein, tending to indicate that grid ratios in excess of 8 are of no value whatever, tending merely to complicate the manufacturing and operational picture.

The present invention, thus, was conceived by discounting the apparent teachings of earlier authorities on the subject. The inventor perceived the possibility of providing and using diaphragms for the elimination of secondary radiation along lines hitherto considered contrary to the teachings and experience of prior investigators. Accordingly, the inventor prepared diaphragms having various grid ratios, as follows:

| Diaphragm | Strip Thickness | Strip Spacement | Strip Width | Grid Ratio |
|---|---|---|---|---|
|  | Mils | Mils | Mils |  |
| A | 2 | 16 | 130 | 8 |
| B | 2 | 16 | 190 | 12 |
| C | 2 | 16 | 270 | 17 |
| D | 2 | 16 | 340 | 21 |
| E | 2 | 16 | 540 | 34 |

A filter factor, or ratio of strip spacement to strip thickness, of 8 was maintained in all of the above grids.

As shown in Figs. 2-6, these grids consisted of alternate strips of exceedingly thin lead foil 20 and thin wood spacing strips 21, the strips being angulated to arrange the foil strips in planes radiating from a focal point disposed 40 inches from, and on a line extending at right angles with respect to, the plane of the diaphragm at its mid point, Fig. 6 showing, to exceedingly large scale, substantially the exact relative proportions of the strip sections, in the mid portions of the ratio 8 grid. The other higher ratio grids employed the same exceedingly small strip thicknesses and spacements, but varied as to strip width, in order to vary the grid ratios of the various diaphragm units.

After completion, the foregoing grids were tested and used to accurately determine their relative operating characteristics. In this connection, it has been recognized for a number of years that more consistent radiographic results are obtainable by using relatively high k. v. p. values for the operation of the X-ray generator, the higher the k. v. p. value, generally speaking, the higher the intensity of the resulting ray beam. The foregoing is particularly true of the so-called "modern" type of X-ray film. Film with "modern" characteristics has been in use for approximately 8 years, and its dominant characteristic is a relatively high degree of contrast in the resulting ray picture. This inherent high degree of contrast, while serving a most useful purpose from the standpoint of improved radiographic quality, introduces a very definite difficulty in the making of satisfactory diagnostic pictures, such difficulty residing in the inherent lack of latitude in the film requiring extreme accuracy in technical procedure if uniform film density, quality, and tissue differentiation are to be obtained in the resulting pictures. While skilled X-ray technicians are naturally better able to control density, quality, and differentiation in ray pictures than those of lesser training and experience, objectionable variation in film density, caused by minor variations in operative procedure, almost invariably occurs, regardless of the skill of the picture making technician.

Because of the wide variation in results obtained, even by highly skilled technicians, standard radiographic procedures have been evolved for the making of radiographs in order to provide for at least more uniformity in ray pictures, even though at the expense, in many instances, of diagnostic quality; on the theory that less harm is done if radiographs are at least more nearly uniform in density, even though other procedures, affording less operational latitude, are capable of producing superior diagnostic pictures, in the hands of highly skilled technicians.

To increase the latitude of operative procedure, and at the same time to provide for greater uniformity in over-all picture density, higher k. v. p. values are recommended and used as a standard procedure. When such so-called "higher" voltage procedures were initiated, greater uniformity of picture density, without question, resulted. Improved uniformity of density, however, was thus obtained by sacrificing contrast and tissue differentiating ability, the deterioration in definition being due to the tendency of increased ray intensity of the "higher" voltage procedure, to wash out tissue differentiation. The present inventor, consequently, as his primary objective, sought to provide means which would permit the use of higher k. v. p. values, that is to say, increased ray intensity in picture making, in order to take advantage of density uniformity and the increased latitude of the so-called "higher" voltage procedure, without however, sacrificing either contrast or the ability to differentiate tissues in the resulting picture. Contrast, within certain limits, is essential to visibility of detail. Every factor which has to do with maximum detail or definition should receive the greatest care and consideration, and yet, if satisfactory contrast is not obtained in the resulting picture, the diagnostic quality of the radiograph definitely is impaired.

The inventor determined to ascertain why the use of increased ray intensity apparently impaired contrast in radiographs made in accordance with "high" voltage procedures. A possible explanation of the phenomenon is that, perhaps, some of the diffuse radiation from the object being pictured, under the stimulation of rays of high intensity, was able to penetrate through the lead strips of the grid, to thereby cause loss in contrast, or possibly the loss in contrast, at higher ray intensity, was due to other causes.

In order to obtain data for the solution of the problem, a test object was built, comprising a water phantom consisting of an aluminum container approximately 1 millimeter in thickness, 10 inches deep, and 14 inches in diameter. Nine inches of water in the container was employed as a scattering medium, in which was immersed a human spine, with its mid-line 4 inches from the bottom of the container, such distance providing a total object-film distance of 6 inches. Five inches from the bottom of the tank, three sections of bronze wire mesh, respectively of 40, 60, and 80 wires per inch, were suspended in water.

The purpose of this phantom was to provide a reasonably accurate substitute for the human body, inasmuch as ordinary tap water has been found to be similar in radiographic characteristics to fleshy body portions. The spine was immersed in the water for a period of 72 hours prior to making radiographic pictures of the test object, to condition it to approximate a live human spine. The wire mesh was used to provide an added means for comparing fine detail as between grids of various ratios and at various operating k. v. p. values.

The foregoing phantom object was radiographed at various ray intensities and at various exposure times, using the above described grids A, B, C, D and E. All exposures were made on Eastman Blue Brand film, used in conjunction with Patterson Parspeed intensifying screens; and all exposures were carefully processed, as nearly as possible under the same conditions.

The focal film distance used was 40 inches, and all of the grids were constructed to a 40 inch radius.

A series of pictures was made at various k. v. p. values, ranging from 50 to 130, exposure time in each case being varied to compensate for the change in k. v. p. value, as well as for changes in grid ratio, which necessitates a somewhat higher number of milliampere-seconds to obtain uniform film density where grids of progressively higher ratio are employed, all other factors remaining the same. The foregoing test pictures, as predicted by the inventor, revealed progressive improvement in tissue differentiating ability with increase in grid ratio, even at the lowest k. v. p. values employed, although the improvement at minimum k. v. p. values used was barely distinguishable.

Fig. 7 is an approximate graphical representation of the relative improvement in picture definition experienced as a result of the present invention.

As noted in Fig. 7, the phantom, for comparative purposes, was also pictured at each k. v. p. value without employing any grid whatever. At lower k. v. p. values the improvement in picture quality of the 8 ratio grid over the comparative pictures made, sans grid, was hardly distinguishable over the improvement afforded in pictures made with the grids of higher ratio. The several series of pictures made at progressively higher k. v. p. values, however, revealed material picture improvement, the tissue differentiating, and consequent diagnostic picture quality, showing astounding improvement with high grid ratios and operating at high k. v. p. values, such improvement being increasingly great as a progressive function of increased grid ratio and increased k. v. p. value. At 100 k. v. p., for example, pictures made without using a grid at all, if anything, revealed impairment in diagnostic quality over the picture made, sans grid, at the 50 k. v. p. value. The same is substantially true of pictures made with the ratio 8 grid. The ratio 12 grid, however, shows a definite improvement at the higher k. v. p. values, maximum improvement in picture quality being attained with a 12 ratio grid, at k. v. p. values up to values of the order of 70 milliamperes. The 17 ratio grid, likewise, affords improvement in picture quality with increase in ray intensity, maximum improvement being experienced at k. v. p. values up to values of the order of 85 milliamperes. The 21 ratio and 34 ratio grids, likewise, show similar, but greater improvement in picture quality with increase in k. v. p. value.

At low and intermediate k. v. p. values, pictures produced with the higher ratio grids each afforded some improvement in picture quality over pictures made with the next lower ratio grid, although at intermediate k. v. p. values such improvement is not extensive. At the higher k. v. p. values, however, the improvement in picture quality with increase in grid ratio is very appreciable.

To verify and complement the foregoing test pictures of the phantom, a number of pictures have been made on living human objects, which confirm the results indicated by the test pictures of the phantom object.

In addition, a similar series of pictures was made of a penetrometer, comprising aluminum strips affording 11 steps, the first consisting of a single strip of aluminum 5 millimeters in thickness, and each succeeding step adding 3 millimeters of aluminum. On each step of the penetrometer, in addition to lead identifying numbers attached thereto, were placed two small squares of bronze wire mesh, respectively 40 and 60 wires per inch in size. This penetrometer was placed in the aluminum tank of the water phantom, in place of the human spine, at an elevation of 2 inches from the bottom of the tank.

A still further set of pictures was made of the phantom containing both the spine and the penetrometer, the purpose of such pictures being to determine the maximum limit of k. v. p. value that could be employed, within practical limits, without destroying contrast between adjoining tissue portions of unlike character.

As a result of all of the foregoing pictures which, aside from the high ratio grids, were made with presently available radiographic equipment, it appears that, even when using grids of exceedingly high ratio, a point of diminishing returns is reached, not only with respect to the effect of increasing k. v. p. value using a grid of selected ratio, but, also, in using grids of increasing ratio at a selected k. v. p. value. At a selected k. v. p value, increasing grid ratio beyond a critical point does not result in sufficient improvement in diagnostic quality of the resulting pictures to warrant the expense of the higher ratio grid. On the other hand, in using a grid of selected ratio, increase in k. v. p. beyond an optimum value, which is different for each grid ratio, increasing with ratio, does not result in sufficient improvement in the diagnostic quality of the resulting pictures, although there is improvement, to appear to warrant the additional expense of operating the generator at the higher k. v. p. values, with consequent reduction in generator life. It is to be conceded, however, that the foregoing observation is made in face of results conducted with screens, films, X-ray generators currently available, and obviously can not take into consideration future developments in X-ray apparatus, which could well modify the situation insofar as it relates to voltages in excess of the k. v. p. values at which ray generators may currently be operated.

There is, of course, also the factor of mass ray absorption, that is to say, the comparative ray absorption as between living tissue. In this connection, the ray absorbing capacity of aluminum, using average procedures, is such that approximately 9 millimeters of aluminum are equivalent to each inch of living abdominal or "soft" tissue. Specific mention is made of the abdominal area because the same comparison can not be made if the tissues are, for example, those comprising the human chest area, which is composed very largely of air spaces. Considering for the moment that 8 inches of abdominal tissue approximates 72 millimeters of aluminum, the test pictures, of spine and penetrometer heretofore described, indicate that the additional opacity of the spine lying within soft abdominal tissue is very small. Heretofore, very little has been known about the actual difference in absorption between the so-called "spine" area and the immediately surrounding tissues. It now appears, however, that the spine itself, when pictured by means of a high ratio grid, represents an additional opacity, in terms of aluminum thickness, of between 1½ and 2 millimeters. This is an exceedingly small difference, for when 2 millimeters of aluminum are immersed in 8 inches of water, the density of that portion of the picture corresponding with the aluminum, and the density of picture portions representing water only, is approximately the same. In view of the foregoing, there is what may be termed a very slight difference in actual opacity between various parts of the body, when comparing the spine or kidneys to the surrounding tissue, under the conditions stated above. It would appear, consequently, that, even if all the secondary or diffuse radiation were prevented from striking the film, there is a voltage limit, under present conditions, beyond which the ratio of absorption difference between the spine and surrounding tissue is so small that it apparently shows as identical on the radiograph. There is, indeed, a voltage limit, for each grid ratio, at which it is difficult, if not impossible, to determine where the spine terminates and the soft surrounding tissues begin.

Nevertheless, the effect of increasing grid ratio above 8 is startling, to say the least, insofar as definition improvement in the resulting picture is concerned. The higher ratio grids make possible the distinct visualization of many areas which, in the past, have been entirely invisible, or, at best, barely and most indistinctly visible.

Diagnostic results obtained through use of grid ratios in excess of 8 are nothing short of remarkable in comparison with what has commonly been accepted as the ultimate perfection in diagnostic ray pictures. Not only are more satisfactory diagnostic results obtained on so-called "average" patients, but a most remarkable improvement is obtained on patients of larger than average size.

Comparable results are obtained by using high ratio grids in connection with the production of fluoroscopic ray pictures, particularly of parts having thick section, such as the stomach and colon.

It is a well known fact that many users of X-ray equipment have limited their work to individuals within maximum size limits. For example, it is common for many X-ray technicians to refrain from attempting to X-ray individuals having a chest thickness in excess of 28 centimeters. The present invention, however, provides means for, and method of, successfully making ray pictures of the heaviest chest structures by only slightly increasing X-ray intensity, well within the practical working limits of the generator and without jeopardizing its service life to any great extent. The fact that greater improvement is noted in pictures of heavier chests is certainly no handicap, particularly when the use of high ratio grids can also be employed to advantage for picturing thinner patients, thereby adding much to the diagnostic value of the resulting pictures by making clearly visible details further out toward the periphery of the chest, without, however, detracting from desirable contrast characteristics.

From the standpoint of operative procedure, it is not necessary when using high ratio grids to materially increase the k. v. p. value above that ordinarily employed, with an 8 ratio grid, in order to produce pictures of the same radiographic density using higher ratio grids, all other factors remaining the same. It is often possible to hold the voltage constant, and to change the milliamperage-second value to meet increased energy requirements. For example, to maintain density, if the 8 ratio grid requires 1 second of exposure time, the 12 ratio grid will require 1.25 seconds; the 17 ratio grid requires 1.5 seconds; the 21 ratio grid requires 1.6 seconds; while the 34 ratio grid requires 1.75 seconds. The foregoing variations in exposure time are based on k. v. p. values within the range between 75 and 100 milliamperes. At k. v. p. values below 75 milliamperes, a somewhat longer relative exposure time is required for the higher grid ratios, but not sufficient to make more than passing mention thereof. Obviously, the increase in exposure necessary at the higher grid ratios is in no sense a deterring factor to the use thereof, being well within the operative service range of standard X-ray generators.

The effect of increased grid ratio on tissue differentiation, in accordance with the present invention, has made it possible to produce shadow pictures of a tissue differentiating character never heretofore obtained by using previous or existing methods. The effect of increased grid ratio on detail sharpness brings forward a factor which, while heretofore recognized in part, has received but little attention.

It is quite evident, particularly when viewing the exposures of the penetrometer immersed in a water phantom, that, as grid ratio is increased, the wire mesh on the penetrometer is not only made more plainly visible, but that the shadow pictures of the wires are sharper. This is undoubtedly due to the elimination of under cutting, which is now established as due to secondary radiation and not to refraction. Radiation which, with a low ratio grid, will strike the film angularly, is excluded by the high ratio grid. The intervening shadows of various structures, thus, become increasingly sharp and clear because the radiation which is allowed to strike and affect the film more nearly follows along the lines of the primary beam from the ray source. Secondary, or scattered, rays, which, with low ratio grids, or, in the absence of a grid, affect the film from various angles, are excluded so that the true value of small focal spot size in producing detail sharpness becomes fully effective.

Areas which vary considerably in thickness and opacity can now be pictured simultaneously by use of the high ratio grids, in accordance with the present invention, without detracting from diagnostic value. For example, it has been determined, among other things, that, even when an anterior, posterior, lumbar spine is pictured at the higher voltages required with use of high ratio grids, excellent pictures of the kidneys and esoas muscles are distinctly visible. The same procedure for photographing lumbar spines, consequently, is now equally satisfactory for kidney radiography. In the past, separate procedures have been essential for the photography of lumbar spines and so-called "soft tissue" kidney radiography procedure.

A further advantage of the present invention relates to conservation in the life of the ray generator. Ordinarily, the recommendation of higher k. v. p. values for the operation of a generator has a tendency to decrease the life of the generator. This is especially true where a tungsten or copper deposit has formed on the inner walls of the generator envelope. Such a deposit on the envelope walls is more detrimental to generator life when operating at higher voltages. Often a generator containing a metallic envelope wall deposits may be operated successfully at low voltage, where at high voltage it would rapidly be destroyed. On the other hand, if, when using high ratio grids with higher voltages, in accordance with the present invention, accompanied by a corresponding decrease in milliampere-seconds, metallic deposits on the envelope walls of the generator will not be as detrimental, nor will deposits occur as rapidly, as when using comparatively low voltages at increased milliampere-seconds. Thus, the higher voltage, lesser milliampere-seconds procedure, of the present invention, is actually in favor of longer tube life.

In this connection, it is fortunate that radiographic density is not a straight line function when either k. v. p. value or milliampere-seconds are varied. If the relationship was such that a 20% reduction in milliampere-seconds could only be accomplished by an increase of 20% in k. v. p., then the higher voltage procedure would very definitely affect the tube in deleterious fashion. The present invention, however, allows the employment of a technique using, for example, 75 k. v. p. at 100 milliampere-seconds, whereby to produce pictures with a grid of selected ratio; and increasing the k. v. p. to a value of, say, 85, or approximately 12%, in voltage, while reducing milliampere-seconds by 60%, in making an equivalent picture with a higher ratio grid. Where k. v. p. has to be increased from a value of 65 to 90, or an increase of approximately 30%, in voltage, the milliampere-seconds, either in the form of milliamperes, or in the form of exposure time, can be reduced by 80%. Thus, in addition to the great improvement in diagnostic results brought about by the utilization of higher grid ratios, in accordance with the present invention, the wear and tear on X-rays generators is, also, materially reduced.

Furthermore, fine focal spot, stationary anode tubes can be employed, as ray sources, inasmuch as the focal spot size depends upon wattage, and this, obviously, is a multiple of kilovoltage and milliamperes. As previously stated, the radiographic effect does not follow these values in accordance with straight line functions, with the result that it is practical and feasible to employ very much finer, effective focal spots, safely, and still obtain superior diagnostic quality in the resulting pictures, in spite of the fact that, when using finer focal spots, a higher voltage is employed, but at a lower milliamperage.

In radiographic procedure, both past and present, the use of cones to reduce the exposed area has been considered essential, particularly in radiography of "heavy" parts or relatively opaque areas, in order to improve detail visibility. The use of cones entails accurate and precise positioning of the tube, object and film. The present invention makes it unnecessary to restrict or limit the exposed area, thereby making entirely practical the coverage on one film only of much larger areas in a single exposure. This advantage, obviously, reduces the number of exposures required on a generator, as well as a material reduction in the amount of X-ray necessarily applied to the patient. By way of example, in accordance with current procedure, it is customary, in radiographing the spinal areas, particularly in lateral view, to make two or three exposures, one for the upper lumbar region, one for the lower lumbar region, including the top or head of the sacrum, and a third for the coccyx. The present invention makes possible and entirely practical the radiography of all three areas in one exposure, this beneficial result being of particular advantage in heavier than average subjects.

The present invention adds very materially to diagnostic results, from every standpoint, and makes possible the use of technical procedures which are far more simple and easier to employ than any previously existing technique.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The method of making ray pictures, which comprises filtering picture making rays between spaced strips of ray opaque material presented edgewise to the rays and having a grid ratio of strip width, in the direction of the rays, to strip spacement, in excess of 8.

2. The method of making ray pictures, which comprises filtering picture making rays between spaced strips of ray opaque material presented edgewise to the rays and having a grid ratio of strip width, in the direction of the rays, to strip spacement, in excess of 8, and regulating ray intensity to obtain optimum picture definition.

3. The method of making X-ray pictures, which comprises activating an object to be pictured with X-rays from a generator having an anode electrically energized for the production of X-rays, filtering picture making rays between spaced strips of ray opaque material presented edgewise to the rays and having a grid ratio of strip width, in the direction of the rays, to strip spacement, in excess of 8, and regulating ray intensity by adjusting the ray producing current and voltage, at the anode of the generator, to obtain optimum picture definition.

4. A diaphragm for the screening of undesirable secondary rays in the making of ray pictures, comprising a plurality of spaced strips of ray opaque material, and means to maintain said strips in the diaphragm in substantially equal vertical spacement between adjacent strips, said diapragm having a grid ratio of strip width, in a direction from front to back of said diaphragm, to strip spacement, in excess of 8.

5. A diaphragm as set forth in claim 4, wherein the vertical spacement of said strips is of the order of 16 mils.

ALLISON M. FILES,

*Executrix of the Estate of Glenn W. Files, Deceased.*

REFERENCES CITED

The following references are of record in the file of this patent:

UNITED STATES PATENTS

| Number | Name | Date |
|---|---|---|
| 2,336,026 | Millenaar | Dec. 7, 1943 |